Patented Feb. 14, 1950

2,497,145

UNITED STATES PATENT OFFICE 2,497,145

SUBSTITUTED GAMMA-2-THENOYL-BUTYRIC ACID

Daniel Hetfield Terry, Plainfield, N. J., and Carlton Webster Croco, Swarthmore, Pa., assignors to E. I. du Pont de Nemours & Company, Wilmington, Del., a corporation of Delaware No Drawing. Application December 11, 1946, Serial No. 715,618

4 Claims. (Cl. 260—329)

This invention relates to novel organic compounds.

It is an object of this invention to produce novel organic compounds useful as intermediates for the synthesis of pharmaceuticals. A further object is to produce novel organic compounds particularly adapted for use as intermediates in the synthesis of biotin and related compounds. Other and further important objects of this invention will become apparent from the following description.

The novel compounds of this invention may be expressed by the general formula

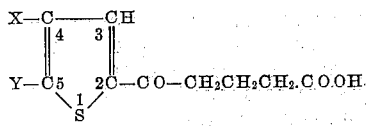

wherein X designates a radical such as nitro, amino or acylamino, while Y stands for hydrogen or halogen when X is nitro, or simply for hydrogen when X is amino or acylamino. The fundamental compound from which the radical

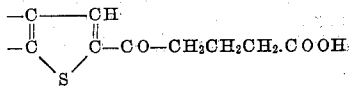

is derived is commonly designated as gamma-2-thenoyl-butyric acid; and in accordance therewith the new compounds of this invention may be designated as 4-nitro, 4-amino or 4-acylamino-gamma-2-thenoyl-butyric acids, and the corresponding 5-halogeno derivatives. Alternatively, they may be expressed by the general formula

R—CO—CH₂CH₂CH₂.COOH wherein R is a thienyl radical attached to the CO group through the 2-position, and carrying in the 4-position a nitro, amino or acylamino group and in the 5-position hydrogen or halogen as above set forth. These compounds are useful as intermediates in the preparation of pharmaceutical compounds structurally related to biotin.

According to this invention, the above new compounds are prepared by nitrating gamma-2-thenoyl-butyric acid or a 5-halogen derivative thereof, for instance 5-bromo-gamma-2-thenoyl-butyric acid. It may be assumed that the nitro group enters into position 4 of the thiophene ring. By reducing the nitro group in customary fashion, gamma - (4-amino-2-thenoyl) - butyric acid is obtained and by acylation the latter may be converted into an optional 4-acylamino derivative such as acetamido, benzoylamino, carboethoxy-amino and the like. If the 4-nitro compound initially prepared contains a halogen atom in the 5-position, the same becomes eliminated in the reduction step.

Without limiting our invention, the following examples are given to illustrate our preferred mode of operation. Parts mentioned are by weight.

*Example 1.—Gamma-(4-nitro-2-thenoyl)-butyric acid*

50 parts of gamma-2-thenoyl-butyric acid were dissolved in 460 parts of 96% sulfuric acid at 3–5° C. while agitating. 50 parts of a mixed acid (containing 33% nitric acid and 67% sulfuric acid) were added to the above solution over a period of 15 minutes at 3–5° C. while agitating. The reaction mass was then agitated at 3–5° C. for 15 minutes longer, and poured into 1500 parts of ice and water. The precipitate was filtered off and washed acid-free with ice water. After several recrystallizations from ethyl alcohol, the product, gamma - (4-nitro-2-thenoyl) - butyric acid was obtained as pale yellow plates melting at 144–146° C.

| Analysis | Found | Calculated for NO₂.C₄H₂S.CO.C₃H₆.COOH |
|---|---|---|
| | Percent | Percent |
| N | 5.85 | 5.76 |
| NO₂ | 18.84 | 18.90 |

The gamma-2-thenoyl-butyric acid employed in the above example was prepared by the method described in J. Biol. Chem., 146, 487–492 (1942), from thiophene and glutaric anhydride, using AlCl₃ as catalyst.

*Example 2.—Gamma-(5-bromo-4-nitro-2-thenoyl)-butyric acid*

Gamma-(5-bromo-2-thenoyl)-butyric acid was prepared by the method used hereinabove to make gamma-(2-thenoyl)-butyric acid, except that we used 2-bromo-thiophene in place of thiophene.

The gamma - (5 - bromo-2-thenoyl)-butyric acid was then nitrated in a manner similar to that set forth above in Example 1, again using mixed acid at 3 to 5° C. and precipitating the product with ice water. The resulting gamma-(5-bromo-4-nitro-2-thenoyl)-butyric acid had a melting point of 152.6–155.4° C. after several recrystallizations from alcohol.

The same product may also be obtained by adding 1 part of gamma-(5-bromo-2-thenoyl)-butyric acid to 10 parts of fuming nitric acid at low temperatures, then pouring the reaction mass into ice and water, and recrystallizing the precipitated acid from alcohol.

*Example 3. — Gamma-(4-carboethoxy-amino-2-thenoyl)-butyric acid*

48.6 parts of gamma-(4-nitro-2-thenoyl)-butyric acid, as obtained in Example 1, were added to a solution of 150 parts of stannous chloride in 170 parts of concentrated hydrochloric acid (37%) at 20–25° C. over a period of fifteen minutes while agitating, and then agitated for one hour longer. The flask was then flushed out with hydrogen to remove the air. 800 parts of sodium hydroxide solution (30%) were slowly added at 20–25° C. while agitating. Then 45 parts of ethyl chlorocarbonate were added slowly and the temperature was allowed to rise to 34° C. and held at 32–34° C. for one hour. Concentrated hydrochloric acid was added slowly until the solution was acid to Congo red test paper at 25–30° C. The precipitate was filtered off and washed with water. The wet cake was dissolved in sodium carbonate solution and filtered. The filtrate was made acid to Congo red test paper with hydrochloric acid. The precipitate was filtered off and washed well with water and dried. After recrystallization from ethyl alcohol, the melting range of the white product, which presumably was gamma-(4-carboethoxy-amino-2-thenoyl)-butyric acid, was 156–159° C.

| Analysis | Found | Calculated for $C_2H_5O.CONH.C_4H_2S.CO.C_3H_6.COOH$ |
|---|---|---|
| | *Percent* | *Percent* |
| $NO_2$ | Nil | 0 |
| N | 4.80 | 4.92 |

*Example 4.—Gamma - (4 - carboethoxy-amino-2-thenoyl)-butyric acid from gamma-(5-bromo-4-nitro-2-thenoyl)-butyric acid*

Gamma-(5-bromo-4-nitro-2-thenoyl)-butyric acid, as obtained in Example 2, was reduced with stannous chloride and treated with ethyl chlorocarbonate by the method described in Example 3. The bromine atom was eliminated during the reduction, and the resulting product was the same as in Example 3.

In a similar manner, gamma-(4-acetylamino-2-thenoyl)-butyric acid was prepared by substituting an equivalent amount of acetic anhydride for ethyl-chloro-carbonate in the above example.

Although the above examples illustrate certain preferred embodiments of this invention, it will be clear that many modifications and equivalents are possible without departing from the spirit of this invention. Thus, in lieu of sulfuric acid in the nitration step other solvents commonly used for nitrations may be employed, for instance glacial acetic acid. The temperature and time of treatment may be varied within wide limits.

In lieu of the bromo derivatives employed in the above examples, other 5-halogeno derivatives may be employed, for instance the 5-chloro or 5-iodo compounds. All these halogen derivatives may be prepared from the corresponding 2-halogen thiopene by the method indicated in Example 2 above, while the preparation of the 2-halogen thiophene itself may follow in general the procedure employed with respect to a series of analogous compounds in copending application of Terry and Croco, Serial No. 637,480, filed December 27, 1945, now abandoned; in other words, by acting with the corresponding free halogen (e. g. chlorine, bromine or iodine) upon thiophene in a suitable solvent, such as glacial acetic acid.

In the reduction of the 4-nitro compounds above to the corresponding amino compounds, the stannous chloride specified may be replaced by other customary reducing agents, for instance iron.

Also other acylating agents may be used in place of ethyl-chloro-carbonate, for instance acetic anhydride, acetyl chloride, benzoyl chloride, etc.

The new compounds are useful in the preparation of pharmaceutical products, containing the thiophene nucleus, for instance biotin and also new biotin-like compounds not found in nature.

We claim as our invention:

1. A compound of the general formula $$R{-}CO{-}CH_2CH_2CH_2.COOH$$

wherein R is a thienyl radical selected from the group consisting of 4-nitro-thienyl, 4-nitro-5-halogeno-thienyl, 4-amino-thienyl, and 4-acylamino-thienyl, the CO group of the above formula being attached to said thienyl radical in the 2-position.

2. Gamma-(4-nitro-2-thenoyl)-butyric acid.

3. Gamma - (5 -bromo - 4 - nitro-2-thenoyl)-butyric acid.

4. Gamma - (4 - acylamino-2-thenoyl)-butyric acid.

DANIEL HETFIELD TERRY.
CARLTON WEBSTER CROCO.

REFERENCES CITED

The following references are of record in the file of this patent:

Steinkopf, "Die Chemie Des Thiophens," 1941, Edwards Lithoprint 1944, pages 71, 74, and 84.